United States Patent
Bonnet et al.

(10) Patent No.: US 9,067,260 B2
(45) Date of Patent: Jun. 30, 2015

(54) STEEL PLATE FOR PRODUCING LIGHT STRUCTURES AND METHOD FOR PRODUCING SAID PLATE

(75) Inventors: Frederic Bonnet, Avril (FR); Olivier Bouaziz, Metz (FR); Jean-Claude Chevallot, Metz (FR); Laure Cala, legal representative, Montigny-les-Metz (FR)

(73) Assignee: ArcelorMittal France, Saint Denis (FR)

( * ) Notice: Subject to any disclaimer, the term of this patent is extended or adjusted under 35 U.S.C. 154(b) by 240 days.

(21) Appl. No.: 12/823,820

(22) Filed: Jun. 25, 2010
(Under 37 CFR 1.47)

(65) Prior Publication Data
US 2013/0174942 A1    Jul. 11, 2013

Related U.S. Application Data

(63) Continuation of application No. 12/439,832, filed as application No. PCT/FR2007/001401 on Aug. 27, 2007, now abandoned.

(30) Foreign Application Priority Data

Sep. 6, 2006    (EP) ..................... 06291413

(51) Int. Cl.
| | |
|---|---|
| *C22C 38/02* | (2006.01) |
| *C22C 38/06* | (2006.01) |
| *C22C 38/14* | (2006.01) |
| *C22C 38/04* | (2006.01) |
| *C21D 8/02* | (2006.01) |
| *B32B 15/18* | (2006.01) |
| *B22D 25/06* | (2006.01) |

(Continued)

(52) U.S. Cl.
CPC .............. *B22D 25/06* (2013.01); *B32B 15/011* (2013.01); *B23P 17/04* (2013.01); *C22C 38/14* (2013.01); *C22C 38/06* (2013.01); *C22C 38/04* (2013.01); *C22C 38/02* (2013.01); *Y10T 428/12965* (2015.01); *B22D 11/001* (2013.01); *C21D 7/00* (2013.01); *C22C 38/002* (2013.01)

(58) Field of Classification Search
USPC ................... 148/328, 330; 420/103, 121, 126
See application file for complete search history.

(56) References Cited

U.S. PATENT DOCUMENTS

| | | | |
|---|---|---|---|
| 6,146,584 A | 11/2000 | Park et al. | |
| 6,846,451 B2 | 1/2005 | Uchida et al. | |

FOREIGN PATENT DOCUMENTS

| | | |
|---|---|---|
| EP | 1156126 A1 | 11/2001 |
| JP | 59 153837 | 9/1984 |

(Continued)

OTHER PUBLICATIONS

Machine-English translation of Japanese patent No. 2005-154826, Okura Kazutaka et al., Jun. 16, 2005.*

(Continued)

*Primary Examiner* — Deborah Yee
(74) *Attorney, Agent, or Firm* — Davidson, Davidson & Kappel, LLC (57) ABSTRACT

The invention relates to a steel plate, the chemical composition of which comprises, the contents being expressed by weight: 0.010%≤C≤0.20%, 0.06%≤Mn≤3%, Si≤1.5%, 0.005%≤Al≤1.5%, S≤0.030%, P≤0.040%, 2.5%≤Ti≤7.2%, (0.45×Ti)−0.35%≤B≤(0.45×Ti)+0.70%, and optionally one or more elements chosen from: Ni≤1%, Mo≤1%, Cr≤3%, Nb≤0.1%, V≤0.1%, the balance of the composition consisting of iron and inevitable impurities resulting from the smelting.

28 Claims, 4 Drawing Sheets

(51) Int. Cl.
  *B32B 15/01*   (2006.01)
  *B23P 17/04*   (2006.01)
  *B22D 11/00*   (2006.01)
  *C21D 7/00*    (2006.01)
  *C22C 38/00*   (2006.01)

(56) References Cited

FOREIGN PATENT DOCUMENTS

| JP | 10-68048 | 3/1998 |
|---|---|---|
| JP | 11-509582 | 8/1998 |
| JP | 2003-64438 | 3/2003 |
| JP | 2004 35948 | 2/2004 |
| JP | 2005-154826 | 6/2005 |
| JP | 2005 154826 | 6/2005 |
| JP | 2005 336548 | 12/2005 |
| WO | 98 38345 | 9/1998 |

OTHER PUBLICATIONS

Table 1.1 entitled "Essential and incidental elements in steel and cast iron", Introduction to Steels and Cast Irons, p. 3,Metals Handbook tenth edition, ASM, 1990.*

* cited by examiner

STEEL PLATE FOR PRODUCING LIGHT STRUCTURES AND METHOD FOR PRODUCING SAID PLATE

The invention relates to the manufacture of plates or structural parts made of steel that combines both a high elastic modulus E, a low density d and a high tensile strength.

It is known that the mechanical performance of structural elements varies as $E^x/d$, the coefficient x depending on the mode of external stressing (for example in tension or in bending) or on the geometry of the elements (plates, bars). This illustrates the benefit of having materials exhibiting both a high elastic modulus and a low density.

This requirement applies most particularly in the automotive industry where vehicle lightening and safety are constant preoccupations. Thus the aim is to increase the elastic modulus and reduce the weight of steel parts by incorporating ceramic particles of various types, such as carbides, nitrides, oxides or borides. The reason for this is that such materials have a markedly higher elastic modulus, ranging from about 250 to 550 GPa, than that of base steels, which is around 210 GPa, into which they are incorporated. In this way, hardening is achieved by load transfer between the matrix and the ceramic particles under the influence of a stress. This hardening is increased further due to the matrix grain size refinement by the ceramic particles. To manufacture these materials comprising ceramic particles distributed uniformly in a steel matrix, processes are known that are based on powder metallurgy: firstly, ceramic powders of controlled geometry are produced, these being blended with steel powders, thereby corresponding, for the steel, to an extrinsic addition of ceramic particles. The powder blend is compacted in a mold and then heated to a temperature such that this blend undergoes sintering. In a variant of the process, metal powders are blended so as to form the ceramic particles during the sintering phase. Despite mechanical properties improved over steels not containing a dispersion of ceramic particles, this type of process suffers from several limitations:

- it requires careful smelting and processing conditions in order not to cause a reaction with the atmosphere, taking into account the high specific surface area of metal powders;
- even after the compacting and sintering operations, residual pores likely to act as initiation sites during cyclic stressing may possibly remain;
- the chemical composition of the matrix/particle interfaces, and therefore their cohesion, is difficult to control given the surface contamination of the powders before sintering (presence of oxides and carbon);
- when the particles are added in large quantity, or when certain large particles are present, the elongation properties decrease;
- this type of process is suitable for low-volume production but cannot meet the requirements of mass production in the automotive industry; and
- the manufacturing costs associated with this type of manufacturing process are high.

In the case of light alloys, manufacturing processes are also known that are based on the extrinsic addition of ceramic powders into the liquid metal. Here again, these processes suffer from most of the abovementioned drawbacks. More particularly, the difficulty of homogeneously dispersing the particles may be mentioned, such particles having a tendency to agglomerate or to settle in or float on the liquid metal.

Among the known ceramics that could be used to increase the properties of steel is in particular titanium diboride $TiB_2$, which has the following intrinsic characteristics:

Elastic modulus: 565 GPa;
Relative density: 4.52.

However, since the manufacturing processes rely on extrinsic additions of $TiB_2$ particles, they suffer the abovementioned drawbacks.

The object of the invention is to solve the above problems, in particular the availability of economically mass-manufacturing steels with an elastic modulus increased by the presence of $TiB_2$ particles. The object of the invention is in particular to provide a continuous casting manufacturing process that does not have particular difficulties when casting the steels.

Another object of the invention is to provide steels having the highest possible amount of $TiB_2$ particles dispersed uniformly in the matrix.

Another object of the invention is to provide high-tensile strength steels, the uniform elongation of which is equal to or greater than 8%, which can be readily subjected to various welding processes, especially resistance welding.

For this purpose, one subject of the invention is a steel plate, the chemical composition of which comprises, the contents being expressed by weight: $0.010\% \leq C \leq 0.20\%$; $0.06\% \leq Mn \leq 3\%$; $Si \leq 1.5\%$; $0.005\% \leq Al \leq 1.5\%$; $S \leq 0.030\%$; $P \leq 0.040\%$, titanium and boron in amounts such that: $2.5\% \leq Ti \leq 7.2\%$; $(0.45 \times Ti) - 0.35\% \leq B \leq (0.45 \times Ti) + 0.70\%$, optionally one or more elements chosen from: $Ni \leq 1\%$; $Mo \leq 1\%$; $Cr \leq 3\%$; $Nb \leq 0.1\%$; $V \leq 0.1\%$, the balance of the composition consisting of iron and inevitable impurities resulting from the smelting.

Preferably, the titanium and boron contents, expressed in % wt, are such that: $-0.22 \leq B - (0.45 \times Ti) \leq 0.35$.

Preferably, the titanium and boron contents, expressed in % wt, are such that: $-0.35 \leq B - (0.45 \times Ti) \leq 0.22$.

Preferably, the titanium content is such that: $4.6\% \leq Ti \leq 6.9\%$.

According to one particular embodiment, the titanium content is such that: $4.6\% \leq Ti \leq 6\%$.

Preferably, the carbon content is such that: $C \leq 0.080\%$.

According to a preferred embodiment, the carbon content satisfies: $C \leq 0.050\%$.

Preferably, the chromium content is such that: $Cr \leq 0.08\%$.

The subject of the invention is also a steel plate of the above composition, comprising $TiB_2$ and optionally $Fe_2B$ eutectic precipitates, the mean size of which is equal to or less than 15 microns, and preferably equal to or less than 10 microns.

Preferably, more than 80% by number of the $TiB_2$ precipitates are of single-crystal character.

Another subject of the invention is a steel plate according to the above features, the mean grain size of said steel being equal to or less than 15 microns, preferably equal to or less than 5 microns and very preferably less than 3.5 microns.

Another subject of the invention is a steel plate as claimed in one of the above features, the elastic modulus of which, measured in the rolling direction, is equal to or greater than 230 GPa, preferably equal to or greater than 240 GPa or preferably equal to or greater than 250 GPa.

According to one particular embodiment, the tensile strength of the steel plate is equal to or greater than 500 MPa and its uniform elongation is equal to or greater than 8%.

Another subject of the invention is an object manufactured from a plurality of steel parts, of identical or different composition and of identical or different thickness, at least one of said steel parts being a steel plate according to any one of the above features, which is welded to at least one of the other parts of this object, the composition or compositions of the other steel parts comprising, by weight: 0.001-0.25% C, 0.05-2% Mn; $Si \leq 0.41$; $Al \leq 0.1\%$; $Ti < 0.1\%$; $Nb < 0.1\%$; $V < 0.1\%$;

Cr<3%; Mo<1%; Ni<1%; B<0.003%, the balance of the composition consisting of iron and inevitable impurities resulting from the smelting.

Another subject of the invention is a process in which a steel is supplied with any one of the above compositions and said steel is cast in the form of a semifinished product, the casting temperature not exceeding more than 40° C. above the liquidus temperature of said steel.

According to one particular embodiment, said semifinished product is cast in the form of a thin slab or thin strip between counter-rotating rolls.

The cooling rate during solidification of the casting is preferable equal to or greater than 0.1° C./s.

According to one particular embodiment, said semi-finished product is reheated before it is hot-rolled, the temperature and the duration of the reheat both being chosen in such a way that the density of the $TiB_2$ and optionally $Fe_2B$ eutectic precipitates, with a maximum size $L_{max}$ greater than 15 microns and an aspect ratio f>5, is less than 400/mm².

According to one particular embodiment, a hot-rolling operation is carried out on the semifinished product, optionally a cold-rolling operation and an annealing operation, the rolling and annealing conditions being adjusted in such a way that a steel plate with a mean grain size equal to or less than 15 microns, preferably equal to or less than 5 microns and very preferably less than 3.5 microns, is obtained.

Preferably, the hot rolling, is carried out with an end-of-rolling temperature below 820° C.

According to one particular embodiment, at least one blank is cut from a steel plate according to one of the above embodiments, or manufactured according to one of the above embodiments, and the blank is deformed within a temperature range from 20° to 900° C.

Another subject of the invention is a manufacturing process in which at least one steel plate according to one of the above embodiments, or a steel plate manufactured according to one of the above embodiments, is welded.

Another subject of the invention is the use of a steel plate or of an object according to one of the above embodiments, or a steel plate manufactured according to one of the above embodiments, for the manufacture of structural parts or reinforcing elements in the automotive field.

Other features and advantages of the invention will become apparent over the course of the description below, given by way of nonlimiting example and with reference to the appended figures in which.

As regards the chemical composition of the steel, the carbon content is adapted for the purpose of economically achieving a given level of yield strength or tensile strength. The carbon content also enables the nature of the matrix microstructure of the steels according to the invention to be controlled, which microstructure may be partially or completely ferritic, bainitic, austenitic or martensitic, or may comprise a mixture of these constituents in proportions suitable for meeting the required mechanical properties. A carbon content equal to or greater than 0.010% enables these various constituents to be obtained.

The carbon content is limited because of the weldability: the cold crack resistance and the toughness in the HAZ (Heat Affected Zone) decrease when the carbon content is greater than 0.20%. When the carbon content is equal to or less than 0.050% by weight, the resistance weldability is particularly improved.

Because of the titanium content of the steel, the carbon content is preferably limited so as to avoid primary precipitation of TiC and/or Ti(C,N) in the liquid metal. These precipitates, which form in the liquid, are deleterious to castability in the process for continuously casting the liquid steel. However, when this precipitation occurs in the solidification range or in solid phase, it has a favorable effect on the structural hardening. The maximum carbon content must therefore be preferably limited to 0.080% so as to produce the TiC and/or Ti(C,N) precipitates predominantly during eutectic solidification or in the solid phase.

In an amount equal to or greater than 0.06%, manganese increases the hardenability and contributes to the solid-solution hardening and therefore increases the tensile strength. It combines with any sulfur present, thus reducing the risk of hot cracking. However, above a manganese content of 3% by weight, there is a greater risk of forming a deleterious banded structure arising from any segregation of the manganese during solidification.

Silicon contributes effectively to increasing the tensile strength thanks to solid solution hardening. However, excessive addition of silicon causes the formation of adherent oxides that are difficult to remove during a pickling operation, and the possible appearance of surface defects due in particular to a lack of wettability in hot-dip galvanizing operations. To maintain good coatability properties, the silicon content must not exceed 1.5% by weight.

In an amount equal to or greater than 0.005%, aluminum is a very effective element for deoxidizing the steel.

However, above a content of 1.5% by weight, excessive primary precipitation of alumina takes place, causing castability problems.

In an amount greater than 0.030%, sulfur tends to precipitate in excessively large amounts in the form of manganese sulfides which very greatly reduce the capability of undergoing hot forming or cold forming.

Phosphorus is an element known to segregate at the grain boundaries. Its content must not exceed 0.040% so as to maintain sufficient hot ductility, thereby avoiding cracking, and to prevent hot cracking during welding.

Optionally, nickel or molybdenum may be added, these elements increasing the tensile strength of the steel. For economic reasons, these additions are limited to 1% by weight.

Optionally, chromium may be added to increase the tensile strength. It also allows larger quantities of borides to be precipitated. However, its content is limited to 3% by weight so as to manufacture a less expensive steel.

A chromium content equal to or less than 0.080% will preferably be chosen. This is because an excessive addition of chromium results in more borides being precipitated, but these are then (Fe, Cr) borides.

Also optionally, niobium and vanadium may be added in an amount equal to or less than 0.1% so as to obtain complementary hardening in the form of fine precipitated carbonitrides.

Titanium and boron play an important role in the invention.

In a first embodiment, the weight contents expressed in percent of titanium and boron of the steel are such that:

2.5%≤Ti≤7.2%; and (0.45×Ti)−0.35%≤B≤(0.45×Ti)+0.70%.

The second relationship can be expressed equivalently as:

−0.35≤B−(0.45×Ti)≤0.70.

The reasons for these limitations are the following:
when the weight content of titanium is less than 2.5%, $TiB_2$ precipitation does not occur in sufficient quantity. This is because the volume fraction of precipitated $TiB_2$ is less than 5%, thereby precluding a significant change in the elastic modulus, which remains less than 220 GPa;
when the weight content of titanium is greater than 7.2%, coarse primary $TiB_2$ precipitation occurs in the liquid metal and causes castability problems in the semifinished products;
if the weight contents of titanium and boron are such that: B−(0.45×Ti)>0.70, there is excessive $Fe_2B$ precipitation, which degrades the ductility; and
if the titanium and boron weight contents are such that: B−(0.45×Ti)<−0.35, the amount of titanium dissolved at room temperature in the matrix is greater than 0.8%. No significant beneficial technical effect is then obtained, despite the higher cost of adding titanium.

According to a second embodiment of the invention, the titanium and boron contents are such that: −0.22≤B−(0.45×Ti)≤0.35:
when B−(0.45×Ti)≤0.35, $Fe_2B$ precipitation is greatly reduced, thereby increasing the ductility; and
when B−(0.45×Ti)≥−0.22, the amount of titanium dissolved in the matrix is very low, which means that the additions of titanium are particularly effective from an economic standpoint.

According to one particular embodiment of the invention, the titanium and boron contents are such that: −0.35≤B−(0.45×Ti)<−0.22:
when the quantity B−(0.45×Ti) is equal to or greater than −0.35 and less than −0.22, the amount of titanium dissolved at ambient temperature in the matrix is between 0.5% and 0.8% respectively. This amount proves to be particularly suitable for obtaining precipitation composed solely of $TiB_2$.

According to one particular embodiment of the invention, the titanium content is such that: 4.6%≤Ti≤6.9%. The reasons for these limitations are the following:
when the weight content of titanium is equal to or greater than 4.6%, $TiB_2$ precipitation takes place in such a way that the precipitated volume fraction is equal to or greater than 10%. The elastic modulus is then equal to or greater than about 240 GPa; and
when the weight content of titanium is equal to or less than 6.9%, the amount of $TiB_2$ primary precipitates is less than 3% by volume. The total $TiB_2$ precipitation, consisting of possible primary precipitates and eutectic precipitates, is then less than 15% by volume.

According to another preferred embodiment of the invention, the titanium content is such that: 4.6%≤Ti≤6%. When the weight content of titanium is equal to or less than 6%, the castability is then particularly satisfactory because of the slight precipitation of primary $TiB_2$ in the liquid metal.

According to the invention, Fe—$TiB_2$ eutectic precipitation occurs upon solidification. The eutectic nature of the precipitation gives the microstructure formed a particular fineness and homogeneity advantageous for the mechanical properties. When the amount of $TiB_2$ eutectic precipitates is greater than 5% by volume, the elastic modulus of the steel measured in the rolling direction can exceed about 220 GPa. Above 10% by volume of $TiB_2$ precipitates, the modulus may exceed about 240 GPa, thereby enabling appreciably lightened structures to be designed. This amount may be increased to 15% by volume in order to exceed about 250 GPa, in particular in the case of steels comprising alloying elements such as chromium or molybdenum. This is because when these elements are present, the maximum amount of $TiB_2$ that can be obtained in the case of eutectic precipitation is increased.

The boron and titanium contents according to the invention prevent coarse primary precipitation of $TiB_2$ in the liquid metal. The formation of these primary precipitates of occasionally large size (measuring several tens of microns) must be avoided because of their deleterious role with respect to damage or fracture mechanisms during subsequent mechanical stressing. Moreover, these precipitates present in the liquid metal, when they do not settle, are locally distributed and reduce the uniformity of the mechanical properties. This premature precipitation must be avoided as it may lead to nozzle blockage when continuously casting the steel as a result of precipitate agglomeration.

As explained above, titanium must be present in sufficient amount to cause endogenous $TiB_2$ formation in the form of Fe—$TiB_2$ eutectic precipitation. According to the invention, titanium may also be present by being dissolved at ambient temperature in the matrix in a superstoichiometric proportion relative to boron, calculated on the basis of $TiB_2$.

When the content of titanium in solid solution is less than 0.5%, the precipitation takes place in the form of two successive eutectics: firstly Fe—$TiB_2$ and then Fe—$Fe_2B$, this second endogenous precipitation of $Fe_2B$ taking place in a greater or lesser amount depending on the boron content of the alloy. The amount precipitated in the form of $Fe_2B$ may range up to 8% by volume. This second precipitation also takes place according to a eutectic scheme, making it possible to obtain a fine uniform distribution, thereby ensuring good uniformity of the mechanical properties.

The precipitation of $Fe_2B$ completes that of $TiB_2$, the maximum amount of which is linked to the eutectic. The $Fe_2B$ plays a role similar to that of $TiB_2$. It increases the elastic modulus and reduces the density. It is thus possible for the mechanical properties to be finely adjusted by varying the complement of $Fe_2B$ precipitation relative to $TiB_2$ precipitation. This is one means that can be used in particular to obtain an elastic modulus greater than 250 GPa in the steel and an increase in the tensile strength of the product. When the steel contains an amount of $Fe_2B$ equal to or greater than 4% by volume, the elastic modulus increases by more than 5 GPa. The elongation at break is then between 14% and 16% and the tensile strength reaches 590 MPa. When the amount of $Fe_2B$ is greater than 7.5% by volume, the elastic modulus is increased by more than 10 GPa, but the elongation at break is then less than 9%.

According to the invention, the mean size of the $TiB_2$ or $Fe_2B$ eutectic precipitates is equal to or less than 15 microns so as to obtain greater elongation at break values and good fatigue properties.

When the mean size of these eutectic precipitates is equal to or less than 10 microns, the elongation at break may be greater than 20%.

The inventors have demonstrated that, when more than 80% by number of the $TiB_2$ eutectic precipitates are of single-crystal character, the matrix/precipitate damage when mechanically stressed is reduced and the risk of forming defects is less because of the greater plasticity of the precipitate and its high level of cohesion with the matrix. In particular, it has been shown that larger $TiB_2$ precipitates form hexagonal crystals. Without wishing to be tied down by one particular theory, it is believed that this crystallographic character increases the possibility of these precipitates deforming by twinning under the effect of a mechanical stress.

This particular single-crystal character, due to the precipitation of $TiB_2$ in a eutectic form, is not encountered to such a degree in the processes of the prior art, which are based on extrinsic additions of particles.

Apart from the favorable effect of a dispersion of endogenous particles on the tensile properties, the inventors have demonstrated that limiting the grain size is a very effective means for increasing the tensile properties: when the mean grain size is equal to or less than 15 microns, the tensile strength may exceed about 560 MPa. In addition, when the grain size is equal to or less than 3.5 microns, the cleavage resistance is particularly high: Charpy toughness tests with a thickness of 3 mm at −60° C. show that the ductile area in the test specimens fractured is greater than 90%.

The process for manufacturing a plate according to the invention is implemented as follows:
  a steel with the composition according to the invention is supplied; and
  the steel is then cast into a semifinished product.

This casting may be carried out to form ingots or carried out continuously to form slabs with a thickness of around 200 mm. It is also possible to cast the steel in the form of thin slabs a few tens of millimeters in thickness or thin strips a few millimeters in thickness between counter-rotating rolls. The latter method of implementation is particularly advantageous for obtaining a fine eutectic precipitation and to prevent the formation of primary precipitates. By increasing the cooling rate during solidification, the fineness of the microstructure obtained is increased.

Of course, the casting may be carried out in a format allowing the manufacture of products having various geometries, in particular in the form of billets for manufacturing long products.

The fineness of the $TiB_2$ and $Fe_2B$ precipitation increases the tensile strength, the ductility, the toughness, the formability and the mechanical behavior in the HAZ. The fineness of the precipitation is increased thanks to a low casting temperature and a higher cooling rate. In particular, it has been discovered that a casting temperature limited to 40° C. above the liquidus temperature leads to such fine microstructures being obtained.

The casting conditions will also be chosen in such a way that the cooling rate during solidification is equal to or greater than 0.1° C./s so that the size of the $TiB_2$ and $Fe_2B$ precipitates are particularly fine.

The inventors have also demonstrated that the morphology of the $TiB_2$ and $Fe_2B$ eutectic precipitates plays a role in the damage during subsequent mechanical solidification. After observing the precipitates under an optical microscope and magnifications ranging from 500×1500× approximately on a surface having a statistically representative population, the maximum size $L_{max}$ and the minimum size $L_{min}$ of each precipitate are determined using image analysis software known per se, such as for example the image analysis software Scion®. The ratio of maximum size to minimum size $L_{max}/L_{min}$ characterizes the aspect ratio f of a given precipitate. The inventors have demonstrated that precipitates of large size ($L_{max}$>15 microns) and of elongate shape (f>5) reduce the uniform elongation and the work-hardening coefficient n.

According to the invention, after the semi-finished product has been cast, the reheat temperature and reheat time for the semi-finished product before subsequent hot rolling are chosen so as to cause the most deleterious precipitates to spheroidize. In particular, the reheat temperature and reheat time are chosen in such a way that the density of elongate (f>5) eutectic precipitates with a size $L_{max}$>15 microns is less than 400/mm².

The semi-finished product then undergoes hot rolling, possibly followed by coiling. Optionally, cold rolling and annealing are carried out in order to obtain thinner plates. The hot-rolling, coiling, cold-rolling and annealing conditions are chosen in such a way that a steel plate with a mean grain size equal to or less than 15 microns, preferably less than 5 microns and very preferably less than 3.5 microns, is obtained. A finer grain size is obtained by:
  substantial work-hardening before the end of hot rolling and before the (γ-α) allotropic transformation that occurs upon cooling;
  a low end-of-rolling temperature, preferably below 820° C.;
  accelerated cooling after the (γ-α) transformation so as to limit ferritic grain growth;
  a coiling operation at a relatively low temperature; and
  after possible cold rolling, the annealing temperature and annealing time are limited for the purpose of obtaining complete recrystallization, without temperature and time exceeding the values necessary for this recrystallization.

An end-of-hot-rolling temperature below 820° C. proves in particular to be an effective means for obtaining a fine grain size. One particular effect of the $TiB_2$ and $Fe_2B$ precipitates on the nucleation and recrystallization of the microstructures has been demonstrated in the steels according to the invention. Specifically, when the steels according to the invention are deformed, the significant difference in mechanical behavior between the precipitates and the matrix leads to greater deformation around the precipitates. This intense local deformation reduces the non-recrystallization temperature. A low end-of-rolling temperature promotes ferritic nucleation around the precipitates and limits grain growth.

Likewise, the higher deformation field around the precipitates promotes grain nucleation during the restoration/recrystallization that follows the cold rolling, resulting in grain refinement.

The steel plate obtained in this way thus exhibits very good formability. Without wishing to be tied down by one particular theory, it is believed that the eutectic precipitates present within a very deformable matrix play a role similar to that played by martensitic or bainitic phases within the ferrite in "dual-phase" steels. The steels according to the invention have a (yield strength $R_e$/tensile strength $R_m$) ratio favorable to a variety of forming operations.

Depending on the carbon content and that of the hardening elements, and depending on the cooling rate below the temperature Ar1 (this temperature denoting the start of transformation upon cooling from austenite), it is possible to obtain hot-rolled plates or cold-rolled and annealed plates comprising matrices with various microstructures—these may be completely or partially ferritic, bainitic, martensitic or austenitic.

For example, a steel containing 0.04% C, 5.9% Ti and 2.3% B will have, after being cooled from 1200° C., a Vickers hardness ranging from 187 to 327 for a cooling rate ranging from 5 to 150° C./s. The highest hardness levels correspond in this case to a completely bainitic matrix composed of carbide-free slightly disoriented laths.

If it is desired to produce a part by a forming operation, a blank is cut from the plate and this is deformed by means such as drawing or bending in a temperature range between 20 and 900° C. The hardening phases $TiB_2$ and $Fe_2B$ exhibit very good thermal stability up to 1100° C.

Because of the thermal stability of the particles dispersed in the matrix and the suitability to the various cold, warm or hot forming processes, parts of complex geometry with an increased elastic modulus may be produced according to the invention. Furthermore, the increase in the elastic modulus of the steels according to the invention reduces the springback after the forming operations and thereby increases the dimensional precision on finished parts.

Advantageously, structural elements are also manufactured by welding the steels according to the invention, having identical or different compositions or identical or different thicknesses, so as in the final stage to obtain parts whose mechanical properties vary within them and are adapted locally to the subsequent stresses.

Apart from iron and inevitable impurities, the composition by weight of the steels that can be welded to the steels according to the invention comprise, for example:
0.001-0.25% C, 0.05-2% Mn; Si≤0.4%; Al≤0.1%; Ti<0.1%; Nb<0.1%; V<0.1%; Cr<3%; Mo<1%; Ni<1%; B<0.003%, the balance of the composition consisting of iron and inevitable impurities resulting from the smelting.

In the melted zone, owing to the high temperature reached, the precipitates partially dissolve and then reprecipitate upon cooling. The amount of precipitates in the melted zone is very comparable to that of the base metal. Within the HAZ of the welded joints, the eutectic precipitates are not dissolved and may even serve to slow down the rate of austenitic grain growth and of possible nucleation sites during the subsequent cooling phase.

During a welding operation carried out on the steels according to the invention, the concentration of $TiB_2$ and $Fe_2B$ precipitates is therefore uniform, going from the base metal to the melted metal passing through the HAZ, thereby guaranteeing, in the case of welded joints, that the intended mechanical properties (modulus, density) will be continuous through said joints.

To give a nonlimiting example, the following results demonstrate the advantageous features conferred by the invention.

EXAMPLE 1

Steels with the composition given in Table 1 below, expressed in percentages by weight, were produced.

Apart from steels I-1 and I-2 according to the invention, this table indicates, for comparison, the composition of a reference steel R-1 that contains no endogenous $TiB_2$ or $Fe_2B$ eutectic precipitates.

These steels were produced by casting semifinished products from the liquid state, the additions of titanium and boron taking place in the case of steels I-1 and I-2 in the form of ferro-alloys. The casting temperature was 1330° C., i.e. 40° C. above the liquidus temperature.

TABLE 1

| | Steel compositions (wt %) | | | | | | | | |
|---|---|---|---|---|---|---|---|---|---|
| Steel | C | S | P | Al | Mn | Si | Ti | B | B − (0.45 × Ti) |
| I-1 | 0.0334 | 0.0004 | 0.007 | 0.263 | 0.069 | 0.084 | 4.50 | 1.68 | −0.34 |
| I-2 | 0.04 | 0.0015 | 0.009 | 0.146 | 0.09 | 0.14 | 5.90 | 2.34 | −0.31 |
| R-1 | 0.0023 | 0.008 | 0.011 | 0.031 | 0.129 | 0.038 | 0.054(*) | —(*) | 0 |

I = According to the invention; R = Reference;
(*)= not according to the invention.

Figure 1:
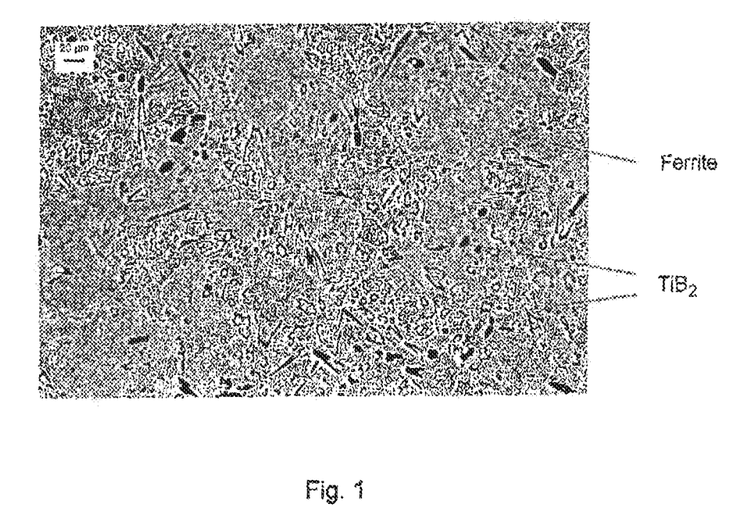
FIGS. 1 and 2 illustrate respectively the microstructure of two steels according to the invention comprising an Fe—$TiB_2$ eutectic precipitation, in the as-cast state.
Figure 2:
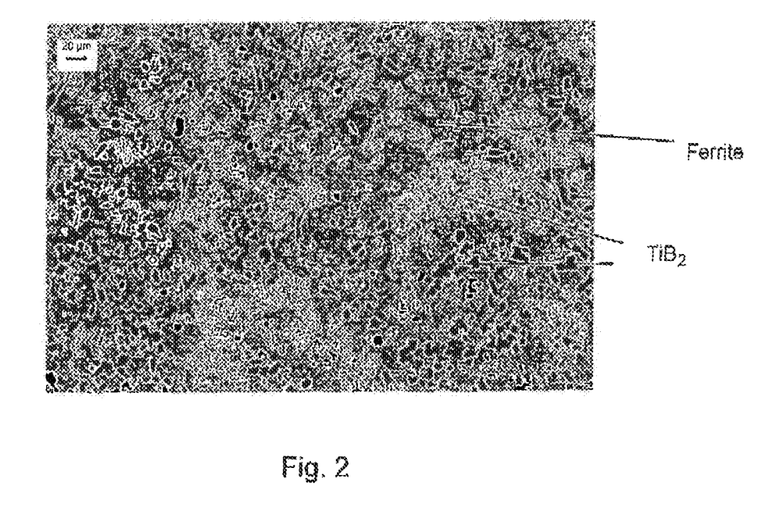

The microstructure in the as-cast state, illustrated in FIGS. 1 and 2, relating to steels I-1 and I-2 respectively, shows a fine uniform dispersion of endogenous $TiB_2$ precipitates within a ferritic matrix, The boron has precipitated in the form of a binary Fe—$TiB_2$ eutectic.

The volume amounts of precipitates were measured by means of an image analyzer and are 9% and 12.4% for steels I-1 and I-2 respectively. The amount of $TiB_2$ in the form of primary precipitates is less than 2% by volume and promotes good castability. The mean sizes of the $TiB_2$ eutectic precipitates are 5 and 8 microns for steels I-1 and I-2 respectively. Among the population of these precipitates, more than 80% by number have a single-crystal character.

After being reheated to 1150° C., the semifinished products were then hot-rolled into forms of plates down to a thickness of 3.5 mm, the end-of-rolling temperature being 940° C. The hot rolling was followed by coiling at 700° C.

Treatments were also carried out by reheating steel I-2 to 1230° C. before hot rolling, for times varying from 30 to 120 minutes. The morphology of the precipitates was then observed. It has been shown that a treatment at 1230° C. for a time of 120 minutes or longer enables the precipitates to be spheroidized in such a way that the density of large ($L_{max}$>15 microns) elongate (f>5) eutectic precipitates is less than 400/$mm^2$.

The uniform elongation $A_u$ and the work-hardening coefficient n are then significantly increased, since they go from 11% and 0.125 (reheat time: 30 minutes) to 16% and 0.165 (reheat time: 120 minutes) thanks to the precipitate spheroidization treatment. Moreover, in the case of steel I-2, a plate was hot-rolled with an end-of-rolling temperature of 810° C.

These hot-rolled plates were then pickled using a process known per se and then cold-rolled down to a thickness of 1 mm. They then underwent recrystallization annealing at 800° C., with a 1 minute soak, before being air cooled.

SEM (Scanning Electron Microscopy) observation showed no-loss of cohesion at the matrix/eutectic precipitate interface or no damage of the precipitates themselves after hot rolling or cold rolling.

After hot rolling, the mean grain size Of steel I-1 was 12 microns, whereas it was 28 microns in the case of the reference steel.

In the case of steel I-2, a low end-of-rolling temperature (810° C.) resulted in a finer mean grain size (3.5 microns) after hot rolling.

Figure 3:
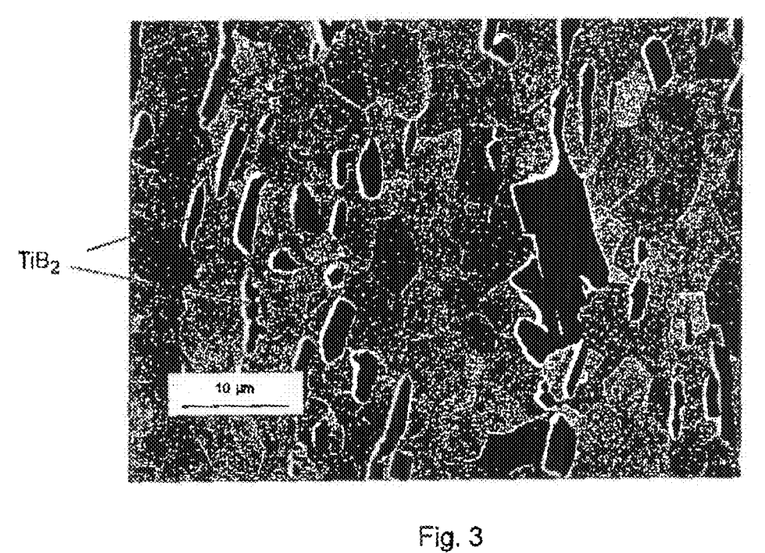
FIG. 3 illustrates the microstructure of a steel according to the invention in the cold-rolled and annealed state.

After cold rolling and annealing, the structure of steels I-1 and I-2 was recrystallized, as indicated in FIG. 3 relating to steel I-1. The micrograph was taken using a scanning electron microscope in crystalline contrast mode, thereby attesting to the completely recrystallized character of the structure. The precipitates are very predominantly eutectic precipitates. Compared with the conventional steel R-1, the $TiB_2$ precipitates cause substantial refinement of the microstructure—the mean grain size is 3.5 microns for steel I-1 according to the invention whereas it is 15 microns in the case of the reference steel R-1.

Pycnometry measurements indicate that the presence of the $TiB_2$ and $Fe_2B$ precipitates is associated with a significant reduction in the relative density d since this goes from 7.80 (conventional steel R-1) to 7.33 (steel I-2).

The elastic moduli of steels I-1 and I-2 measured in the rolling direction were 230 GPa and 240 GPa respectively. The elastic modulus of the reference steel R-1 was 210 GPa. For sheets stressed in bending, the performance index of which varied as $E^{1/3}/d$, the use of the steels according to the invention enabled a weight reduction of more than 10% over the conventional steels to be obtained.

The measured tensile properties (conventional yield strength $R_e$ measured at 0.2% strain, tensile strength $R_m$, uniform elongation $A_u$ and elongation at break $A_t$) are given in Table 2 (hot-rolled plates). or Table 3 (cold-rolled and annealed plates) below.

TABLE 2

Tensile properties of hot-rolled plates (parallel to the rolling direction)

| Steel | $R_e$ (MPa) | $R_m$ (MPa) | $A_u$ (%) | $A_t$ (%) |
|---|---|---|---|---|
| I-1 | 300 | 558 | 15 | 22 |
| I-2 | 244 | 527 | 14 | 20 |

TABLE 3

Tensile properties of cold-rolling and annealed plates (parallel to the rolling direction)

| Steel | $R_e$ (MPa) | $R_m$ (MPa) | $A_u$ (%) | $A_t$ (%) |
|---|---|---|---|---|
| I-1 | 311 | 565 | 16 | 21 |
| R-1 | 200 | 300 | 42 | 48 |

The $R_e/R_m$ ratio of the hot-rolled or cold-rolled plates according to the invention is close to 0.5, resulting in mechanical behavior approaching that of a dual-phase steel and good capability of subsequent forming.

Spot resistance welding tests were carried out on cold-rolled plates of steel I-1: in tension-shear tests, failure systematically occurs by peeling. It is known that this is a preferred fracture mode as it is associated with a high energy.

It has also been shown that, within the melted zones in welding, eutectic precipitates according to the invention are present, thereby helping to make the mechanical properties in welded assemblies uniform.

Satisfactory properties were also obtained in laser welding and arc welding.

EXAMPLE 2

Table 4 below shows the compositions of three steels according to the invention.

TABLE 4

Compositions of steels according to the invention (wt %)

| Steel | C | Mn | Al | Si | S | P | Ti | B | B – (0.45 Ti) |
|---|---|---|---|---|---|---|---|---|---|
| I-3 | 0.0465 | 0.082 | 0.15 | 0.17 | 0.0014 | 0.008 | 5.5 | 2.8 | 0.32 |
| I-4 | 0.0121 | 0.086 | 0.113 | 1.12 | 0.002 | 0.004 | 5.37 | 2.86 | 0.44 |
| I-5 | 0.0154 | 0.084 | 0.1 | 0.885 | 0.0019 | 0.004 | 5.5 | 3.16 | 0.68 |

The steels were produced by casting semifinished products, the additions of titanium and boron taking place in the form of ferro-alloys. The casting temperature was 40° C. above the liquidus temperature. Compared with steels I-1 and I-2, steels I-3 to I-5 have an excess amount of boron compared to $TiB_2$ stoichiometry, in such a way that $TiB_2$ and then $Fe_2B$ eutectic coprecipitations take place. The volume amounts of eutectic precipitates are given in Table 5.

TABLE 5

Contents of precipitates (vol %) of steels I-3, I-4 and I-5.

| Steel | $TiB_2$ (vol %) | $Fe_2B$ (vol %) |
|---|---|---|
| I-3 | 13 | 3.7 |
| I-4 | 12.8 | 5.1 |
| I-5 | 13 | 7.9 |

Figure 4:
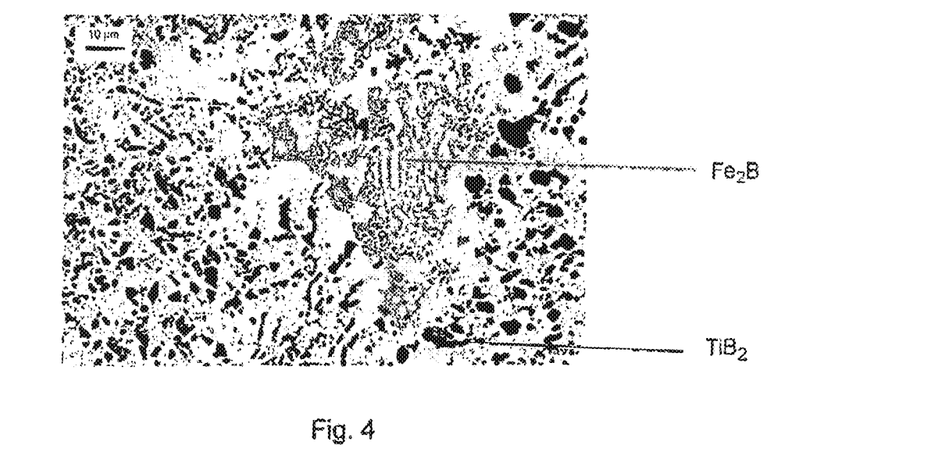
FIGS. 4 and 5 illustrate the microstructure of two steels according to the invention, comprising Fe—$TiB_2$ and Fe—$Fe_2B$ eutectic precipitations, in the as-cast state and hot-rolled state respectively.

The eutectic precipitates had an average size of less than 10 microns. FIG. 4 illustrates, in the case of steel I-3, the coexistence of $TiB_2$ and $Fe_2B$ precipitates. The light gray $Fe_2B$ precipitates and the darker $TiB_2$ precipitates are dispersed within the ferritic matrix.

Figure 5:
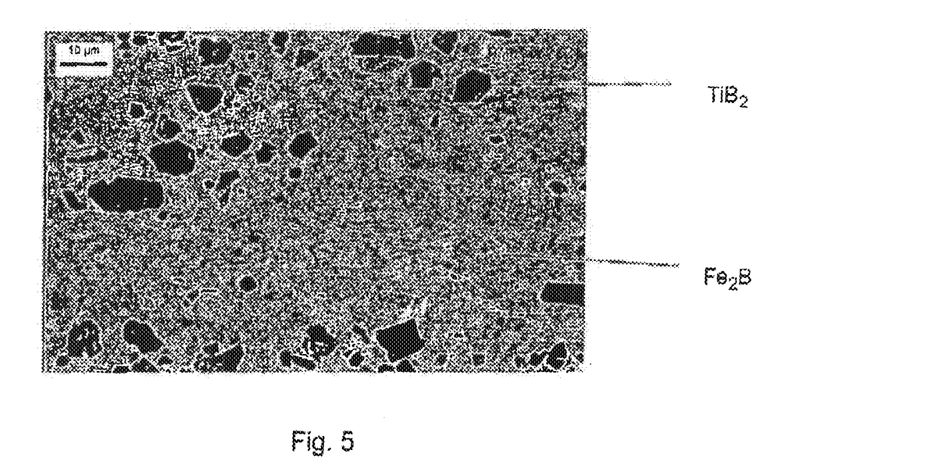

The semifinished products were hot-rolled under conditions identical to those presented in Example 1. Here again, no damage to the precipitate-matrix interface was observed. FIG. 5 illustrates the microstructure of steel I-5. The properties of these hot-rolled steels are given in Table 6.

TABLE 6

Tensile properties (parallel to the rolling direction) and relative density of hot-rolled plates.

| Steel | E (GPa) | $R_e$ (MPa) | $R_m$ (MPa) | $A_u$ (%) | $A_t$ (%) | d |
|---|---|---|---|---|---|---|
| I-3 | 245 | 279 | 511 | 10 | 14 | 7.32 |
| I-4 | 250 | 284 | 590 | 11 | 14 | 7.32 |
| I-5 | 254 | 333 | 585 | 8 | 9 | 7.30 |

Compared with steels I-1 and I-2, a complementary eutectic precipitation of $Fe_2B$ in an amount by volume ranging from 3 to 7.9% increases the elastic modulus by an amount ranging from 5 to 15 GPa.

The complementary precipitation of $Fe_2B$ increases the tensile strength. When this precipitation takes place in excessive proportions, the uniform elongation may however be markedly less than 8%.

EXAMPLE 3

Figure 6:
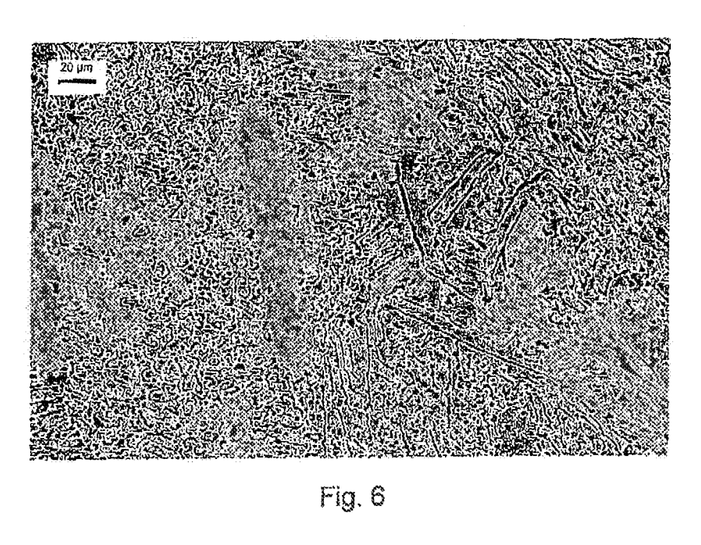
FIGS. 6 and 7 illustrate the microstructure of a steel according to the invention, cooled at two cooling rates during solidification, in the as-cast state.
Figure 7:
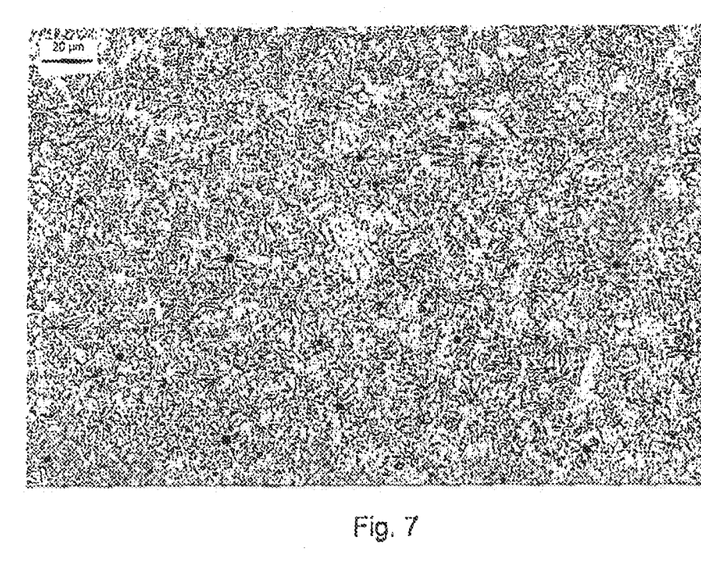

Semifinished products made of steel of composition I-2 were cast at a temperature of 1330° C. By varying the intensity of the flow for cooling the semifinished products and the thickness of the cast semifinished products, two cooling rates were achieved, i.e. 0.8° C./s and 12° C./s. The microstructures given in FIGS. 6 and 7 illustrate that an increased cooling rate very significantly refines the Fe—$TiB_2$ eutectic precipitation.

EXAMPLE 4

Plates of steel with the composition I-2, 2.5 mm in thickness, were welded by $CO_2$ laser welding under the following conditions: Power: 5.5 kW; welding speed: 3 m/min. Micrographs of the melted zone show that Fe—$TiB_2$ eutectic precipitation takes place in a very fine form upon cooling from the liquid state. The amount of precipitates in the melted zone is close to that of the base metal. Depending on the local cooling conditions during solidification (local temperature gradient G, displacement rate R of the isotherms), the solidification takes place in dendritic form or in cellular form. The dendritic morphology is encountered more readily at the joint with the HAZ, given the local solidification conditions (high gradient G and low rate R).

The $TiB_2$ precipitates are therefore present in the various zones of the joint (base metal, HAZ and melted zone). Thus, the increase in elastic modulus and the reduction in density occur throughout the welded joint.

A plate of steel I-2 was also laser welded without any operating difficulty with a plate of drawable mild steel, the composition of which contained (in wt %): 0.003% C, 0.098% Mn, 0.005% Si, 0.059% Al, 0.051% Ti, 0.0003% B and inevitable impurities resulting from the smelting. The melted zone also contained Fe—$TiB_2$ eutectic precipitates, of course in a lower proportion than in the case of autogenous welding. Consequently, it is possible to manufacture metal structures whose stiffness properties vary locally and whose mechanical properties correspond more specifically to the local processing or service behavior requirements.

EXAMPLE 5

Cold-rolled and annealed plates of steel I-2 according to the invention, with a thickness of 1.5 mm, were joined by resistance spot welding under the following conditions:
  assembly force: 650 daN;
  welding cycle: 3 (7 periods with the current I flowing+2 periods with no current flowing).

The welding range, expressed in terms of the current I, was between 7 and 8.5 kA. The two bounds for this range correspond, on the one hand, to obtaining a core diameter greater than 5.2 mm (lower current bound) and, on the other hand, the appearance of sparking during welding (upper bound). The steel according to the invention therefore shows good weldability by resistance spot welding with a sufficiently wide, 1.5 kA, weldability range.

The invention thus allows the manufacture of structural parts or reinforcing elements with an improved level of performance, both from the standpoint of intrinsic lightening and increase in elastic modulus. The easy processing of the steel plates according to the invention by welding makes it possible to incorporate them into more complex structures, in particular by means of joints with parts made of steels of different composition or different thickness.

The automotive field will most particularly benefit from these various features.

The invention claimed is:

1. A steel plate, the chemical composition of which comprises steel, the contents being expressed by weight:

$0.010\% \leq C \leq 0.05\%$ $0.06\% \leq Mn \leq 3\%$ $Si \leq 1.5\%$ $0.005\% \leq Al \leq 1.5\%$ $S \leq 0.030\%$ $P \leq 0.040\%$, titanium and boron in amounts such that:

$4.6\% \leq Ti \leq 6\%$ $-0.35 \leq B-(0.45 \times Ti) \leq -0.22$, the balance of the composition consisting of iron and inevitable impurities resulting from a smelting process.

2. The steel plate of claim 1, wherein the composition comprises, the content being expressed by weight:

$Cr \leq 0.08\%$.

3. The steel plate of claim 1, wherein it comprises $TiB_2$ and optionally $Fe_2B$ eutectic precipitates, the mean size of which is equal to or less than 15 microns.

4. The steel plate of claim 1, wherein it comprises $TiB_2$ and optionally $Fe_2B$ eutectic precipitates, the mean size of which is equal to or less than 10 microns.

5. The steel plate of claim 1, wherein more than 80% by number of said $TiB_2$ precipitates are of single-crystal character.

6. A steel plate, the chemical composition of which comprises steel, the contents being expressed by weight:

$0.010\% \leq C \leq 0.05\%$ $0.06\% \leq Mn \leq 3\%$ $Si \leq 1.5\%$ $0.005\% \leq Al \leq 1.5\%$ $S \leq 0.030\%$ $P \leq 0.040\%$, titanium and boron in amounts such that:

$4.6\% \leq Ti \leq 6\%$ $(0.45 \times Ti)-0.35\% \leq B \leq (0.45 \times Ti)+0.70\%$, the balance of the composition consisting of iron and inevitable impurities resulting from the smelting,
  a mean grain size of said steel being equal to or less than 15 microns.

7. The steel plate of claim 6, wherein the mean grain size of said steel is equal to or less than 5 microns.

8. The steel plate of claim 6, wherein the mean grain size of said steel is equal to or less than 3.5 microns.

9. The steel plate of claim 6, wherein its elastic modulus measured in the rolling direction is, equal to or greater than 230 GPa.

10. The steel plate of claim 6, wherein its elastic modulus measured in the rolling direction is equal to or greater than 240 GPa.

11. The steel plate of claim 6, wherein its elastic modulus measured in the rolling direction is equal to or greater than 250 GPa.

12. The steel plate of claim 6, wherein its tensile strength is equal to or greater than 500 MPa and its uniform elongation is equal to or greater than 8%.

13. A manufacturing process comprising the steps of:
supplying a steel plate, the chemical composition of which comprises steel, the contents being expressed by weight:

$0.010\% \leq C \leq 0.05\%$ $0.06\% \leq Mn \leq 3\%$ $Si \leq 1.5\%$ $0.005\% \leq Al \leq 1.5\%$ $S \leq 0.030\%$ $P \leq 0.040\%$, titanium and boron in amounts such that:

$4.6\% \leq Ti \leq 6\%$ $(0.45 \times Ti) - 0.35\% \leq B \leq (0.45 \times Ti) + 0.70\%$, the balance of the composition consisting of iron and inevitable impurities resulting from the smelting,
casting the steel in a form of a semifinished product, the casting temperature not exceeding more than 40° C. above the liquidus temperature of said steel;
reheating said semi-finished before it is hot-rolled, the temperature and the duration of said reheat both being chosen in such a way that a density of $TiB_2$ and optionally $Fe_2B$ eutectic precipitates, with a maximum size $l_{max}$ greater than 15 microns and an aspect ratio $f > 5$, is less than $400/mm^2$; and
hot rolling said semi-finished product.

14. The manufacturing process as claimed in claim 13, wherein said semifinished product is cast in the form of a thin slab or thin strip between counter-rotating rolls.

15. The manufacturing process of claim 13, wherein the cooling rate during solidification of said casting is equal to or greater than 0.1° C./s.

16. A manufacturing process comprising the steps of:
supplying a steel plate, the chemical composition of which comprises steel, the contents being expressed by weight:

$0.010\% \leq C \leq 0.05\%$ $0.06\% \leq Mn \leq 3\%$ $Si \leq 1.5\%$ $0.005\% \leq Al \leq 1.5\%$ $S \leq 0.030\%$ $P \leq 0.040\%$, titanium and boron in amounts such that:

$4.6\% \leq Ti \leq 6\%$ $(0.45 \times Ti) - 0.35\% \leq B \leq (0.45 \times Ti) + 0.70\%$, the balance of the composition consisting of iron and inevitable impurities resulting from the smelting,
casting the steel in a form of a semifinished product, the casting temperature not exceeding more than 40° C. above the liquidus temperature of said steel;
hot-rolling said semifinished product;
and a cold-rolling operation and an annealing operation, the rolling and annealing conditions being adjusted in such a way that a steel plate with a mean grain size equal to or less than 15 microns is obtained.

17. The process of claim 16, wherein the mean grain size equal to or less than 5 microns is obtained.

18. The process of claim 17, the mean grain size equal to or less than 3.5 microns is obtained.

19. The process of claim 13, wherein said hot-rolling operation is carried out with an end-of-rolling temperature below 820° C.

20. A process for manufacturing a structural part, comprising the steps of:
supplying a steel plate, the chemical composition of which comprises steel, the contents being expressed by weight:

$0.010\% \leq C \leq 0.05\%$ $0.06\% \leq Mn \leq 3\%$ $Si \leq 1.5\%$ $0.005\% \leq Al \leq 1.5\%$ $S \leq 0.030\%$ $P \leq 0.040\%$, titanium and boron in amounts such that:

$4.6\% \leq Ti \leq 6\%$ $(0.45 \times Ti) - 0.35\% \leq B \leq (0.45 \times Ti) + 0.70\%$, the balance of the composition consisting of iron and inevitable impurities resulting from the smelting,
cutting at least one blank from the steel plate; and
deforming said at least one blank within a temperature range from 20° to 900° C., the deforming condition being adjusted in such a way that a steel plate with a mean grain size equal to or less than 15 microns is obtained.

21. A process for manufacturing a structural part, or reinforcing element comprising: welding at least one steel plate of claim 1 to form said structural part or reinforcing element.

22. The manufacturing process of claim 21, wherein said structural part or reinforcing element is one used for the manufacture of a structural part or of a reinforcing element in the automotive field.

23. The steel plate of claim 1, the chemical composition further comprising, the contents being expressed by weight, one or more elements chosen from:

$Ni \leq 1\%$;

$Mo \leq 1\%$;

$Cr \leq 3\%$;

$Nb \leq 0.1\%$; or $V \leq 0.1\%$.

24. The steel plate of claim 6, the chemical composition further comprising, the contents being expressed by weight, one or more elements chosen from:

$Ni \leq 1\%$;

$Mo \leq 1\%$;

Cr≤3%;

Nb≤0.1%; or

V≤0.1%.

25. The manufacturing process of claim 13, the chemical composition further comprising, the contents being expressed by weight, one or more elements chosen from:

Ni≤1%;

Mo≤1%;

Cr≤3%;

Nb≤0.1%; or

V≤0.1%.

26. The manufacturing process of claim 20, the chemical composition further comprising, the contents being expressed by weight, one or more elements chosen from:

Ni≤1%;

Mo≤1%;

Cr≤3%;

Nb≤0.1%; or

V≤0.1%.

27. The steel plate of claim 1, wherein its elastic modulus measured in a rolling direction is, equal to or greater than 230 GPa.

28. The steel plate of claim 1, wherein a mean grain size of said steel is equal to or less than 5 microns.

* * * * *